Nov. 24, 1964

R. I. PAGE ETAL 3,158,085

BROILER UNIT

Filed June 25, 1962

INVENTORS.
RICHARD I. PAGE
RONALD D. WALTHER
BY

Merchant, Merchant & Gould

ATTORNEYS

Nov. 24, 1964  R. I. PAGE ETAL  3,158,085
BROILER UNIT
Filed June 25, 1962  2 Sheets-Sheet 2
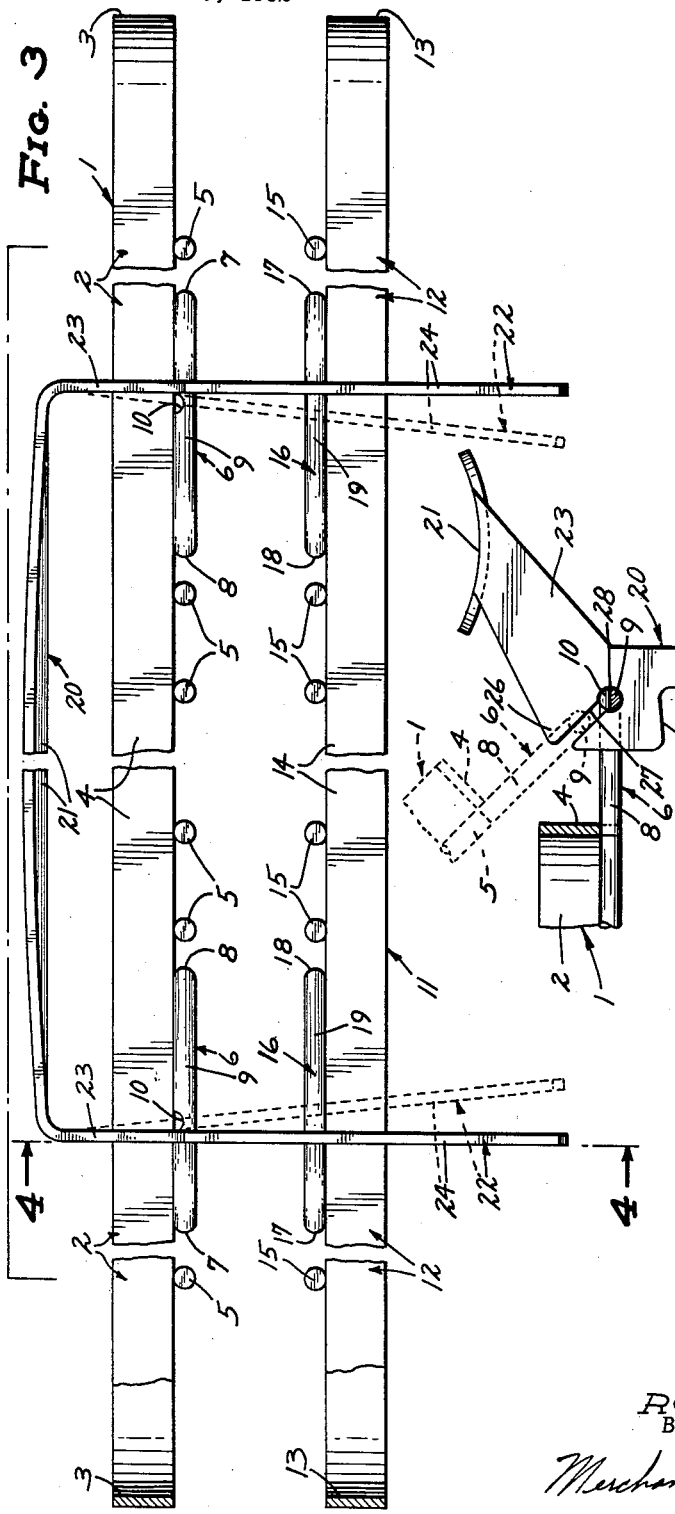
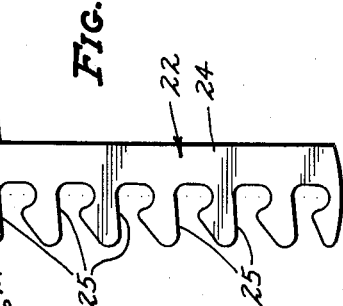
INVENTORS.
RICHARD I. PAGE
RONALD D. WALTHER
BY
ATTORNEYS United States Patent Office 3,158,085
Patented Nov. 24, 1964

3,158,085
BROILER UNIT
Richard I. Page, Excelsior, and Ronald D. Walther, Minneapolis, Minn., assignors to Foley Manufacturing Company, Minneapolis, Minn., a corporation of Minnesota
Filed June 25, 1962, Ser. No. 204,694
1 Claim. (Cl. 99—402)

This invention relates generally to equipment and utensils used for cooking, and more particularly it relates to an improved broiler unit.

While devices of the general character described herein have previously been in use for some time, the present invention comprehends the provision of a broiler unit having several differenences and advantages not characteristic of previously known structures. Generally speaking, the present invention comprises a pair of vertically spaced broiler racks and a pair of horizontally spaced rack-supporting standards one each disposed adjacent the opposite ends of the broiler racks for supporting the same, said broiler racks and supporting standards being constructed and arranged in a novel manner as described particularly hereinafter.

An important object of this invention is the provision of a broiler unit constructed and designed so as to permit the efficient and positive support of the broiler racks and also permit the rapid and easy disassembly of the entire unit.

Another object of this invention is the provision of a broiler unit in which the supporting standards thereof are hingedly connected to the upper broiler rack and in which the addition of the lower broiler rack provides stability for the entire unit.

Another object of this invention is the provision of a broiler unit in which the upper broiler rack cannot be be removed or disconnected from the spaced supporting standards unless the lower boiler rack has previously been removed or disassambled.

A further object of this invention is the provision of a broiler unit in which the opposite supporting standards thereof are constructed in a novel manner with depending leg portions, and in which the lower broiler rack may be adjustably arranged in various vertical positions with respect to the depending legs of the spaced supporting standards.

Still further objects of this invention reside in the provision of a broiler unit which may be quickly assembled without the use of tools, which is strong and durable throughout long periods of continued use, which may be economically manufactured, and which is highly efficient in its operation.

The above and still further objects and advantages of this invention will become apparent from a consideration of the following detailed specification, appended claim and attached drawings.

Referring to the drawings, which illustrate the invention, and wherein like reference characters indicate like parts or elements throughout the several views:

FIG. 3 is a view in end elevation thereof, with some parts being broken away, and with an alternative position of some parts thereof being shown by dotted lines; and FIG. 4 is a view in section taken on the line 4—4 of FIG. 3, with an alternative position of the upper broiler rack being represented by dotted lines.

Figure 1:
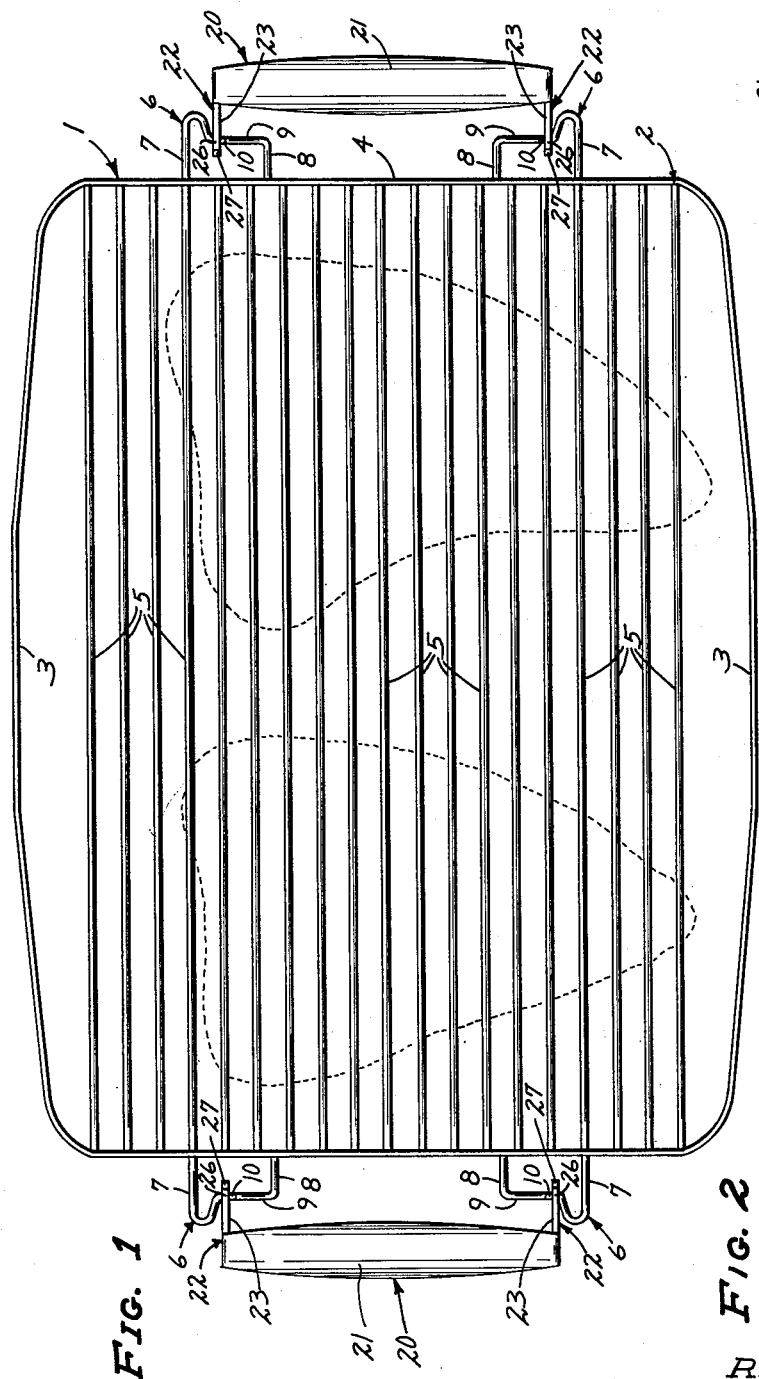
FIG. 1 is a view in top plan of a broiler unit as described herein.
Figure 2:
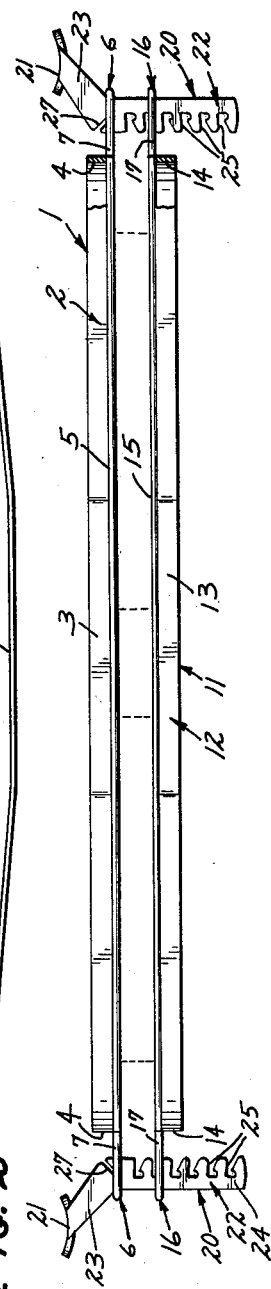
FIG. 2 is a view in side elevation thereof, with some parts being broken away.

Referring more particularly to the drawings, the novel broiler unit disclosed herein comprises a generally horizontally extending upper broiler rack, represented generally by the reference numeral 1. The upper broiler rack 1 comprises an annular frame 2 having spaced side portions 3, and spaced end portions 4, and said upper broiler rack 1 further comprising a plurality of laterally spaced generally parallel longitudinally extending bars or rods 5 rigidly secured at their opposite end portions to the frame end portions 4. The opposite frame end portions 4 of the upper broiler rack 1 are each provided with a pair of generally horizontally spaced generally U-shaped connector elements 6. Each of the connector elements 6 comprises a relatively long side portion 7, a relatively short side portion 8, and an angularly formed intermediate portion 9 which is provided with a detent 10, the latter of which is sometimes referred to herein as a reduced portion.

The broiler unit disclosed herein further comprises a generally horizontally extending lower broiler rack, represented generally by the reference numeral 11, and which is generally similar to the upper broiler rack 1 and spaced vertically therebelow in general parallelism therewith. The lower broiler rack 11 comprises an annular frame 12 having spaced side portions 13 and spaced end portions 14, and further comprises a plurality of laterally spaced generally parallel longitudinally extending bars or rods 15 rigidly secured at their opposite end portions to the frame end portions 14. The opposite frame end portions 14 of the lower broiler rack 11 are each provided with a pair of generally horizontally spaced generally U-shaped connector elements 16. Each of the connector elements 16 comprises a relatively long side portion 17, a relatively short side portion 18, and an angularly formed intermediate portion 19.

In accordance with this invention, the broiler unit disclosed herein further comprises a pair of horizontally spaced generally upstanding rack-supporting standards, each represented generally by the reference numeral 20. The rack-supporting standards 20 are one each disposed adjacent the oposite frame end portions 4, 14 of the vertically spaced upper and lower broiler racks 1, 11. The rack-supporting standards 20 are constructed generally in an inverted U-shape form, as shown particularly in FIG. 3. Since the rack-supporting standards 20 are of similar construction, the description of one thereof will be specifically noted. Each of the rack-supporting standards 20 comprises an upper intermediate handle portion 21 of generally cross-sectionally arcuate construction. Each of the rack-supporting standards 20 further comprises a pair of depending legs 22 one each disposed on an opposite side said intermediate handle portion 21. The depending legs 22 of each of the standards 20 are generally horizontally aligned with one another and each of the legs 22 comprises an upper angle portion 23 connected to the adjacent end portion of said intermediate handle portion 21 and which upper angle portion 23 extends generally downwardly and angularly inwardly generally toward the broiler racks 1, 11. The depending legs 22 are provided with abutment means, more particularly described hereinafter, for engagement with the connector elements 6, 16 of the broiler racks 1, 11 so as to support the same in their vertically spaced relationship.

According to present practices, each of the legs 22 of the rack-supporting standards 20 further comprises a lower portion 24 having a plurality of vertically spaced slots 25 disposed for selective engagement with the adjacent connector element 16 of the lower broiler rack 11. The inner portion of the slots 25 extend downwardly, as shown particularly in FIG. 4, so as to provide detention means for the connector elements 16 of the lower broiler rack 11. As shown particularly in FIG. 4, each of the depending legs 22 further comprises a knee portion 26 disposed generally at the junction of the lower portion 24 thereof with said upper angle portion 23 thereof. The knee portion 26 of each depending leg 22 defines a downwardly and outwardly extending slot 27 which terminates in a relatively wider generally circular end recess portion 28. The slots 27 of the knee portions 26 are adapted to receive or engage the reduced portion or detent 10 of the adjacent connector element 6 of the upper broiler rack 1.

An important feature of this invention is shown particularly in FIG. 4 wherein it will be noted that the end recess portion 28 of the slot 27 of each knee portion 26 is slightly larger than the cross-sectionally generally circular upper broiler rack connector elements 6, whereas the width of the slot 27 is less than the diameter of the connector elements 6. As shown particularly in said FIG. 4, the construction of the slot 27 and the connector elements 6 is such as to require a relative angular movement between the upper broiler rack 1 and the rack-supporting standards 20 to the position of the upper broiler rack 1 shown by dotted lines in FIG. 4 in order to permit insertion and removal of the connector elements 6.

Another important feature of this invention is illustrated particularly in FIG. 3, wherein it will be noted that the depending legs 22 of the rack-supporting standards 20 are more widely spaced than the spacing between the reduced detents of the connector elements 6 of the upper broiler rack 1 whereby to require a slight movement of the legs 22 of the standards 20 inwardly toward one another to the position shown by dotted lines in FIG. 3 so as to permit engagement and disengagement between the slots 27 and the upper broiler rack connector elements 6. Of course, it should be understood that the above described inward movement of the legs 22 to the dotted line position shown in FIG. 3 must be generally coincidental with the relative angular movement of the upper broiler rack 1 to the dotted line position thereof shown in FIG. 4 in order to permit engagement and disengagement therebetween.

After the upper broiler rack 1 has been received and positioned with respect to the rack-supporting standards 20 in the manner described above, the addition of the lower broiler rack 11, and the placement of the connector elements 16 thereof in previous selections of the slots 25 of the leg lower portions 24, imparts stability to the entire broiler unit. Obviously, the height of the lower broiler rack 11 may be adjusted by changing the position of the connector elements 16 thereof with respect to different ones of the slots 25 in accordance with the various articles to be held by the broiler unit. Illustrative articles for broiling are shown in the drawings by dotted lines.

This invention has been thoroughly tested and found to be completely satisfactory for the accomplishment of the above objects and purposes; and while a preferred embodiment thereof has been shown and described above, it should be specifically understood that the same may be modified without departure from the scope and spirit of the appended claim.

What is claimed is:

A broiler unit comprising:
(a) a generally horizontally extending upper broiler rack, said upper broiler rack having opposite end portions which each define a pair of generally horizontally spaced connector elements each having a reduced portion,
(b) a generally horizontally extending lower broiler rack generally similar to said upper broiler rack and spaced vertically therebelow, said lower broiler rack having opposite end portions which each define a pair of generally horizontally spaced connector elements,
(c) a pair of horizontally spaced generally upstanding rack-supporting standards each one disposed adjacent the opposite end portions of said vertically spaced upper and lower broiler racks, said standards both being generally of inverted U-shape form and said standards each comprising:
  (1) an upper intermediate handle portion, and
  (2) a pair of depending legs each one disposed on an opposite side of said intermediate handle portion, said legs of each of said standards being generally horizontally aligned with one another and each of said legs comprising an upper angle portion connected to said intermediate handle portion and which upper angle portion extends generally downwardly and angularly inwardly generally toward said broiler racks, and each leg further comprising a lower portion having a plurality of vertically spaced slots disposed for selective engagement with the adjacent connector element of said lower broiler rack, each of said legs further comprising a knee portion disposed generally at the junction of said lower portion thereof with said upper angle portion thereof and said knee portion thereof defining a slot for engagement with the reduced portion of the adjacent connector element of said upper broiler rack, and the knee portions of each of said standards being more widely spaced than the spacing between the reduced portions of said spaced connector elements of said upper broiler rack whereby to require a slight movement of said leg of each of said standards inwardly toward one another to permit engagement and disengagement between the same and said upper broiler rack connector elements.

References Cited in the file of this patent
UNITED STATES PATENTS

| | | |
|---|---|---|
| 891,660 | Boeck | June 23, 1908 |
| 1,326,003 | Spohr | Dec. 23, 1919 |
| 2,234,596 | Heilman | Mar. 11, 1941 |